United States Patent
Bian

(10) Patent No.: US 12,204,146 B2
(45) Date of Patent: Jan. 21, 2025

(54) WAVEGUIDE CROSSINGS WITH A FREE SPACE PROPAGATION REGION

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 237 days.

(21) Appl. No.: 17/869,065

(22) Filed: Jul. 20, 2022

(65) Prior Publication Data

US 2024/0027684 A1 Jan. 25, 2024

(51) Int. Cl.
G02B 6/125 (2006.01)
G02B 6/122 (2006.01)
G02B 6/136 (2006.01)
G02B 6/12 (2006.01)

(52) U.S. Cl.
CPC ........... *G02B 6/125* (2013.01); *G02B 6/1228* (2013.01); *G02B 6/136* (2013.01); *G02B 2006/12061* (2013.01)

(58) Field of Classification Search
CPC ...................................... G02B 6/125
See application file for complete search history.

(56) References Cited

U.S. PATENT DOCUMENTS

| | | | |
|---|---|---|---|
| 10,429,582 B1 | 10/2019 | Bian et al. | |
| 10,649,140 B1 | 5/2020 | Bian et al. | |
| 10,718,903 B1 | 7/2020 | Bian et al. | |
| 10,816,725 B2 | 10/2020 | Bian et al. | |
| 10,989,873 B1 | 4/2021 | Jacob et al. | |
| 11,422,305 B2 * | 8/2022 | Liu | G02B 6/125 |
| 2017/0254951 A1 | 9/2017 | Dumais et al. | |
| 2019/0189664 A1 * | 6/2019 | Benahmed | G01N 33/4833 |
| 2020/0088942 A1 * | 3/2020 | Bian | G02B 6/125 |
| 2022/0146748 A1 | 5/2022 | Bian | |

FOREIGN PATENT DOCUMENTS

CN 110031934 A * 7/2019

OTHER PUBLICATIONS

Bock et al., Subwavelength grating crossings for silicon wire waveguides, Jul. 19, 2010 / vol. 18, No. 15 / Optics Express 16146 (Year: 2010).*

(Continued)

*Primary Examiner* — Charlie Y Peng
(74) *Attorney, Agent, or Firm* — Thompson Hine LLP; Anthony Canale

(57) ABSTRACT

Structures for a waveguide crossing and methods of forming such structures. The structure comprises a first waveguide core including a first section, a second section, and a first longitudinal axis. The first section and the second section are aligned along the first longitudinal axis, the first section is terminated by a first end, the second section is terminated by a second end, and the first end of the first section is longitudinally spaced from the second end of the second section by a gap. The structure further comprises a second waveguide core having a second longitudinal axis angled relative to the first longitudinal axis. The second longitudinal axis of the second waveguide core crosses the first longitudinal axis of the first waveguide core within the gap.

20 Claims, 14 Drawing Sheets

(56) References Cited

OTHER PUBLICATIONS

Ryotaro Konoike et al., "SiN/Si double-layer platform for ultralow-crosstalk multiport optical switches," Optics Express 27, 21130-21141 (2019).

Kuanping Shang et al., "Low-loss compact multilayer silicon nitride platform for 3D photonic integrated circuits," Optics Express 23, 21334-21342 (2015).

W. D. Sacher et al., "Monolithically Integrated Multilayer Silicon Nitride on-Silicon Waveguide Platforms for 3-D Photonic Circuits and Devices," in Proceedings of the IEEE, vol. 106, No. 12, pp. 2232-2245, Dec. 2018, doi: 10.1109/JPROC.2018.2860994.

Adam M. Jones et al., "Ultra-low crosstalk, CMOS compatible waveguide crossings for densely integrated photonic Interconnection networks," Optics Express 21, 12002-12013 (2013).

Sailong Wu et al., "State-of-the-Art and Perspectives on Silicon Waveguide Crossings: A Review," Micromachines (Basel), MDPI;11(3):326. doi: 10.3390/mi11030326 (Mar. 20, 2020).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

B. Peng et al., "A CMOS Compatible Monolithic Fiber Attach Solution with Reliable Performance and Self-alignment," In Optical Fiber Communication Conference (OFC), OSA Technical Digest (Optica Publishing Group, 2020), paper Th3l.4 (2020).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).

W. S. Lee et al., "Automatic Waveguide Balancing Using Point Set Operations," 2022 Optical Fiber Communications Conference and Exhibition (OFC), 2022, pp. 1-3.

Bian, Yusheng, "Optical Couplers With Diagonal Light Transfer" filed on Nov. 11, 2021 as a U.S. Appl. No. 17/524,218.

* cited by examiner

WAVEGUIDE CROSSINGS WITH A FREE SPACE PROPAGATION REGION

BACKGROUND

The disclosure relates to photonics chips and, more specifically, to structures for a waveguide crossing and methods of forming such structures.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

A waveguide crossing is building block used in photonics chips to provide paths for propagating optical signals. Waveguide cores may be arranged in multiple levels on a photonics chip. For example, a waveguide core may be formed in a lower level by patterning a layer of material, and a waveguide core may be formed in an upper level by patterning another layer of material. In the layout of the photonics chip, the waveguide core in the upper level may be routed over and across the waveguide core in the lower level at a waveguide crossing. Such direct crossings of waveguide cores may result in significant insertion loss and high cross-talk due to strong light scattering induced by the close local proximity of the waveguide cores in the different levels.

Improved structures for a waveguide crossing and methods of forming such structures are needed.

SUMMARY

In an embodiment of the invention, a structure for a waveguide crossing is provided. The structure comprises a first waveguide core including a first section, a second section, and a first longitudinal axis. The first section and the second section are aligned along the first longitudinal axis, the first section is terminated by a first end, the second section is terminated by a second end, and the first end of the first section is longitudinally spaced from the second end of the second section by a gap. The structure further comprises a second waveguide core having a second longitudinal axis angled relative to the first longitudinal axis. The second longitudinal axis of the second waveguide core crosses the first longitudinal axis of the first waveguide core within the gap.

In an embodiment of the invention, a structure for a waveguide crossing is provided. The structure comprises a dielectric layer, a first waveguide core positioned below the dielectric layer, a second waveguide core positioned above the dielectric layer, a third waveguide core positioned below the dielectric layer, and a fourth waveguide core positioned above the dielectric layer. The first waveguide core includes a section terminated by a first end and aligned along a first longitudinal axis, the second waveguide core includes a section terminated by a second end and aligned along a second longitudinal axis that is parallel to the first longitudinal axis, and the second end is longitudinally spaced from the first end by a first gap. The third waveguide core includes a section terminated by a third end and aligned along a third longitudinal axis, and the fourth waveguide core includes a section terminated by a fourth end and aligned along a fourth longitudinal axis that is parallel to the third longitudinal axis, and the fourth end is longitudinally spaced from the third end by a fourth gap. The first longitudinal axis and the second longitudinal axis are angled relative to the third longitudinal axis and the fourth longitudinal axis.

In an embodiment of the invention, a method of forming a structure for a waveguide crossing is provided. The method comprises forming a first waveguide core including a first section, a second section, and a first longitudinal axis. The first section and the second section are aligned along the first longitudinal axis, the first section is terminated by a first end, the second section is terminated by a second end, and the first end of the first section is longitudinally spaced from the second end of the second section by a gap. The method further comprises forming a second waveguide core having a second longitudinal axis angled relative to the first longitudinal axis. The second longitudinal axis of the second waveguide core crosses the first longitudinal axis of the first waveguide core within the gap.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
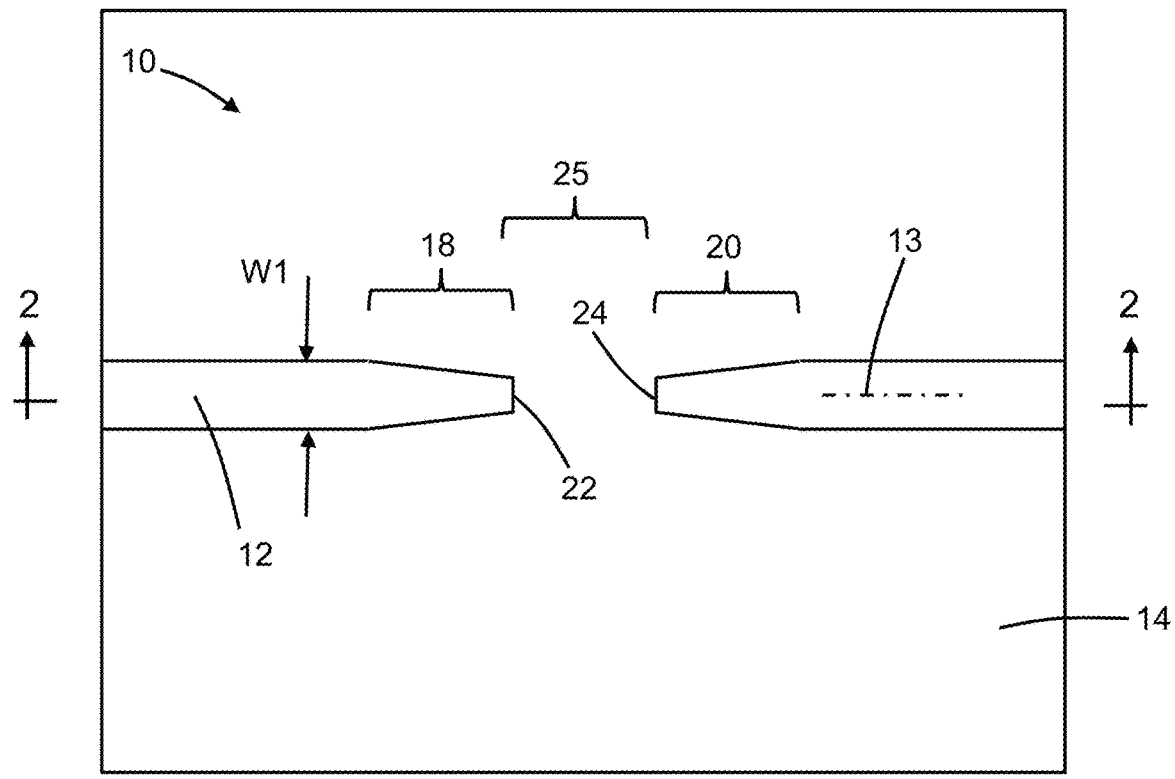
FIG. 1 is a top view of a structure at an initial fabrication stage of a processing method in accordance with embodiments of the invention.
Figure 2:
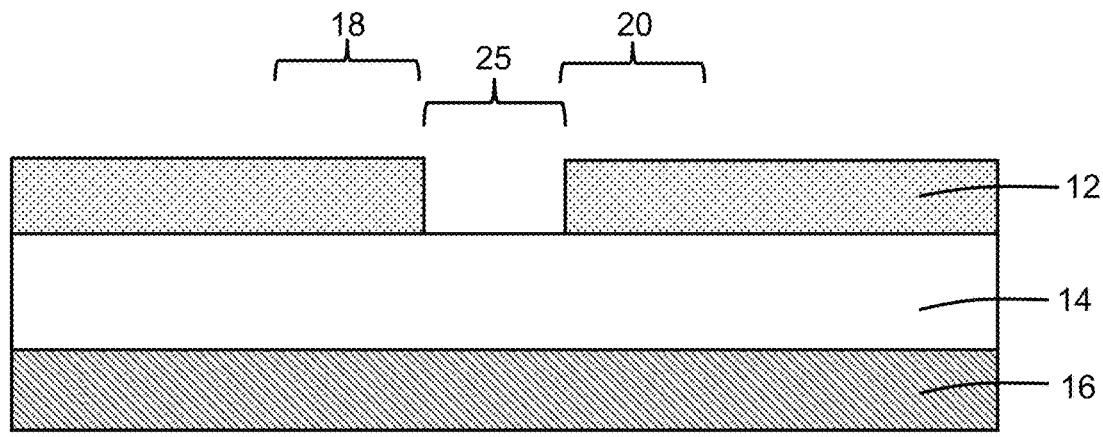
FIG. 2 is a cross-sectional view taken generally along line 2-2 in FIG. 1.

With reference to FIGS. 1, 2 and in accordance with embodiments of the invention, a structure 10 for a waveguide crossing includes a waveguide core 12 that is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, one or more additional dielectric layers comprised of a dielectric material, such as silicon dioxide, may be positioned between the dielectric layer 14 and the waveguide core 12.

The waveguide core 12 may include a section 18, a section 20, an end 22 that terminates the section 18, and an end 24 that terminates the section 20. The waveguide core 12 may be lengthwise aligned along a longitudinal axis 13. Each of the sections 18, 20 of the waveguide core 12 may be connected to other optical components.

The waveguide core 12 may have a width dimension W1 that varies in the section 18 and the section 20. In an embodiment, the width dimension W1 of the section 18 may longitudinally increase with increasing distance from the end 22 from a minimum width to a maximum width. In an embodiment, the width dimension W1 of the section 20 may longitudinally increase with increasing distance from the end 24 from a minimum width to a maximum width. The width dimension W1 of the section 18 may longitudinally increase opposite to the longitudinal increase in the width dimension W1 of the section 20. In an embodiment, the width dimension W1 of the sections 18, 20 may linearly increase with increasing distance from the respective ends 22, 24. In an alternative embodiment, the width dimension W1 of the sections 18, 20 may increase based on a non-linear function, such as a quadratic function, a cubic function, a parabolic function, a sine function, a cosine function, a Bezier function, or an exponential function. In an embodiment, the sections 18, 20 may each have a uniform taper angle as a result of the increasing width dimension W1. In an alternative embodiment, the sections 18, 20 may taper in multiple stages each having a different taper angle.

The end 22 of the section 18 is spaced in a lateral direction from the end 24 of the section 20 by a gap 25. The gap 25 defines a discontinuity in the waveguide core 12 across which light propagating in the waveguide core 12 can be transferred between the sections 18, 20 with minimal attenuation. In an embodiment, propagating light may be transferred across the gap 25 from the section 18 to the section 20. In an embodiment, propagating light may be transferred across the gap 25 from the section 20 to the section 18.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon. In an alternative embodiment, the waveguide core 12 may be comprised of a dielectric material, such as silicon nitride, silicon oxynitride, or aluminum oxide. In alternative embodiments, other materials, such as a polymer or a III-V compound semiconductor, may be used to form the waveguide core 12.

In an embodiment, the waveguide core 12 may be formed by patterning a layer of material with lithography and etching processes. In an embodiment, the waveguide core 12 may be formed by patterning the semiconductor material (e.g., single-crystal silicon) of a device layer of a silicon-on-insulator substrate. In an embodiment, the waveguide core 12 may be formed by patterning a deposited layer of a material (e.g., silicon nitride). In an alternative embodiment, a slab layer may be connected to a lower portion of the waveguide core 12. The slab layer may be formed when the waveguide core 12 is patterned, and the slab layer, which is positioned on the dielectric layer 14, may have a thickness that is less than the thickness of the waveguide core 12.

Figure 3:
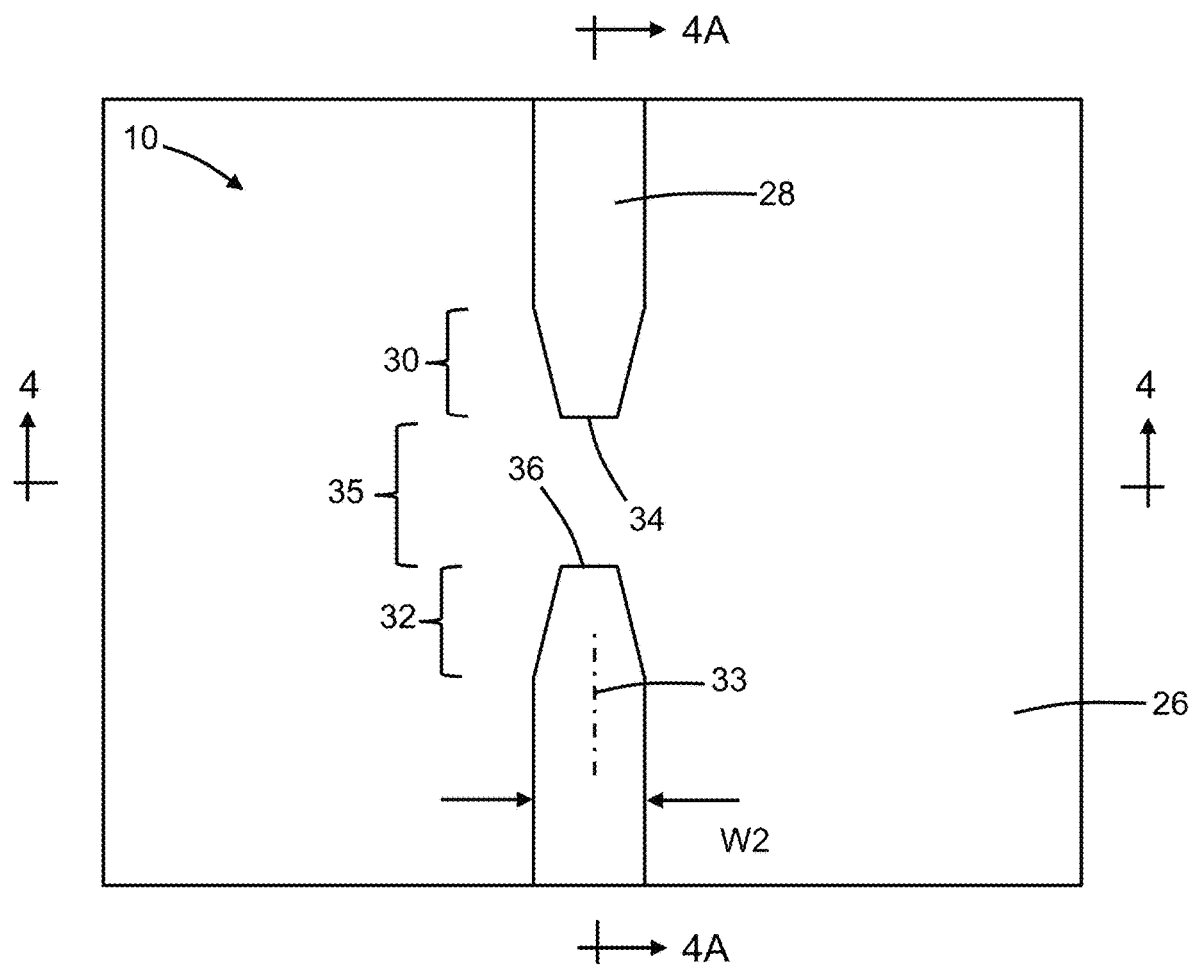
FIG. 3 is a top view of the structure at a fabrication stage of the processing method subsequent to FIG. 1.
Figure 4:
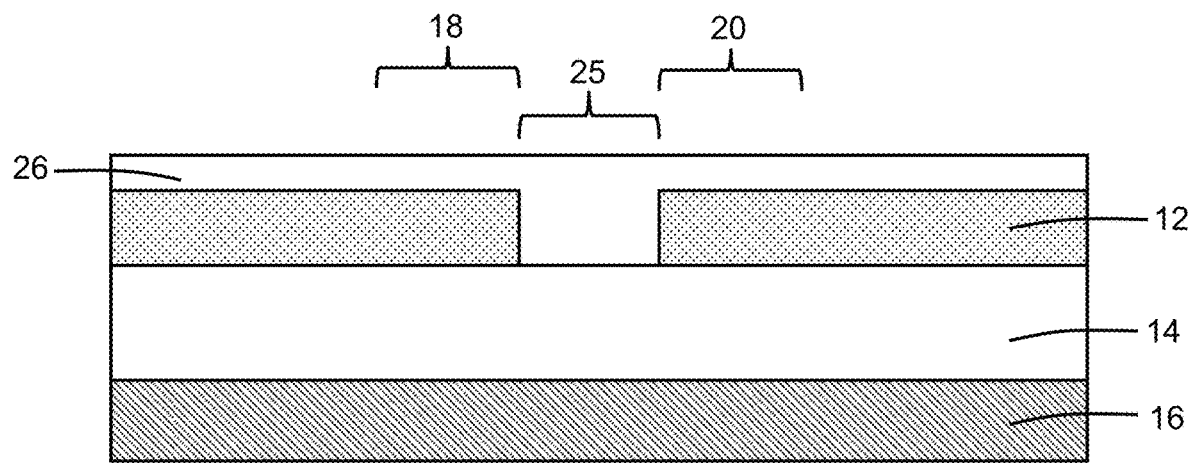
FIG. 4 is a cross-sectional view taken generally along line 4-4 in FIG. 3.
Figure 4A:
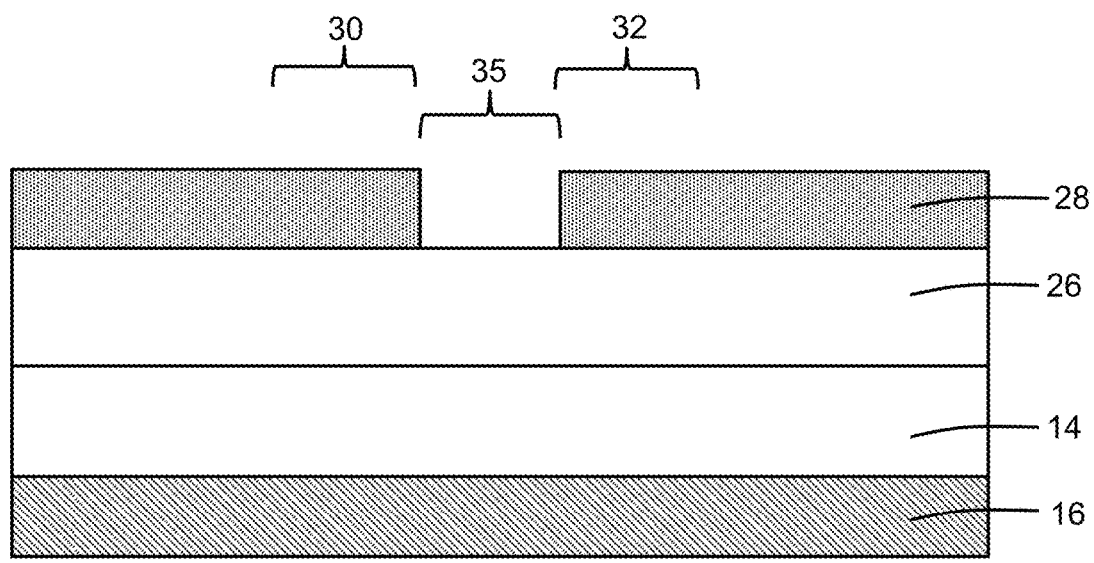
FIG. 4A is a cross-sectional view taken generally along line 4A-4A in FIG. 3.

With reference to FIGS. 3, 4, 4A in which like reference numerals refer to like features in FIGS. 1, 2 and at a subsequent fabrication stage, a dielectric layer 26 is formed over the waveguide core 12. The dielectric layer 26 may be comprised of a deposited dielectric material, such as silicon dioxide, having a lower refractive index than the dielectric material constituting the waveguide core 12. The waveguide core 12 is embedded in the dielectric layer 26, which may be planarized after deposition, because the dielectric layer 26 is thicker than the height of the waveguide core 12. As a result, the gap 25 between the section 18 and the section 20 is filled by the dielectric material of the dielectric layer 26. The thickness of the dielectric layer 26 and the height of the waveguide core 12 may be adjustable variables.

The structure 10 may further include a waveguide core 28 that is positioned over the dielectric layer 26 and in a different elevation or level within the structure 10 than the waveguide core 12. The waveguide core 28 is spaced in a vertical direction above the waveguide core 12 by a spacing or distance that may be in a range of 1 nanometer to 500 nanometers.

The waveguide core 28 may include a section 30, a section 32, an end 34 that terminates the section 30, and an end 36 that terminates the section 32. The waveguide core 28 may be lengthwise aligned along a longitudinal axis 33. Each of the sections 30, 32 of the waveguide core 28 may be connected to other optical components.

The waveguide core 28 may have a width dimension W2 that varies in the section 30 and the section 32. In an embodiment, the width dimension W2 of the section 30 may longitudinally increase with increasing distance from the end 34 from a minimum width to a maximum width. In an embodiment, the width dimension W2 of the section 32 may longitudinally increase with increasing distance from the end 36 from a minimum width to a maximum width. The width dimension W2 of the section 30 may longitudinally increase opposite to the longitudinal increase in the width dimension of the section 32. In an embodiment, the width dimension W2 of the sections 30, 32 may linearly increase with increasing distance from the respective ends 34, 36. In an alternative embodiment, the width dimension W2 of the sections 30, 32 may increase based on a non-linear function, such as a quadratic function, a cubic function, a parabolic function, a sine function, a cosine function, a Bezier function, or an exponential function. In an embodiment, the sections 30, 32 may each have a uniform taper angle as a result of the increasing width dimension W2. In an alternative embodiment, the sections 30, 32 may taper in multiple stages each having a different taper angle.

The end 34 of the section 30 is spaced in a lateral direction from the end 36 of the section 32 by a gap 35. The gap 35 defines a discontinuity in the waveguide core 28 across which light propagating in the waveguide core 28 can be transferred across a free space propagation region between the sections 30, 32 with minimal attenuation. In an embodiment, propagating light may be transferred across the gap 35 from the section 30 to the section 32. In an embodiment, propagating light may be transferred across the gap 35 from the section 32 to the section 30.

The waveguide core 28 may be comprised of a material having a refractive index that is greater than the refractive index of silicon dioxide. In an embodiment, the waveguide core 28 may be comprised of a different material than the waveguide core 12. In an embodiment, the waveguide core 28 may be comprised of a dielectric material, such as silicon nitride or silicon oxynitride. In an alternative embodiment, the waveguide core 28 may be comprised of a semiconductor material, such as polysilicon. In alternative embodiments, other materials, such as a polymer or a III-V compound semiconductor, may be used to form the waveguide core 28. In an embodiment, the waveguide core 28 may be formed by depositing a layer of its constituent material on the dielectric layer 14 and patterning the deposited layer with lithography and etching processes. In an alternative embodiment, a slab layer may be connected to a lower portion of the waveguide core 28. The slab layer may be formed when the waveguide core 28 is patterned, and the slab layer, which is positioned on the dielectric layer 26, has a thickness that is less than the thickness of the waveguide core 28.

The gap 35 may overlap with the gap 25 (FIG. 2) such that the free space propagation regions are stacked within different levels in a vertical direction. In an embodiment, the gap 35 may have a width dimension of that is greater than the width dimension W1 of the waveguide core 12. In an embodiment, the gap 25 may have a width dimension that is greater than the width dimension W2 of the waveguide core 28.

The longitudinal axis 33 of the waveguide core 28 is aligned at an angle relative to the longitudinal axis 13 of the waveguide core 12. In an embodiment, the longitudinal axis 33 of the waveguide core 28 may be aligned transverse to the longitudinal axis 13 of the waveguide core 12. The sections 30, 32 of the waveguide core 28 have a non-overlapping relationship with the sections 18, 20 of the waveguide core 12.

Figure 5:
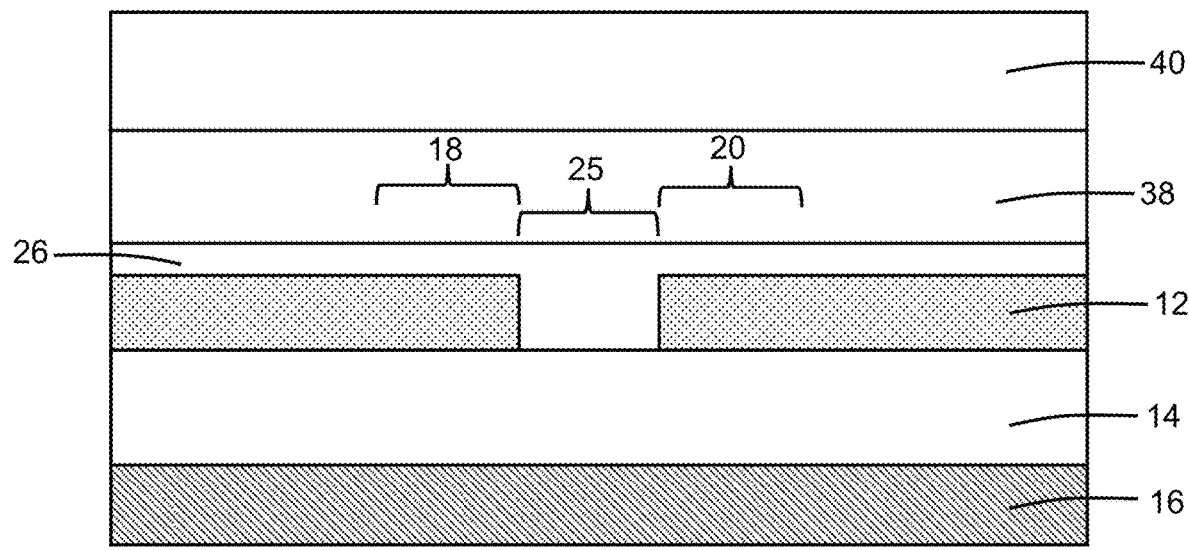
FIGS. 5, 5A are cross-sectional views of the structure at a fabrication stage of the processing method subsequent to FIGS. 4, 4A.
Figure 5A:
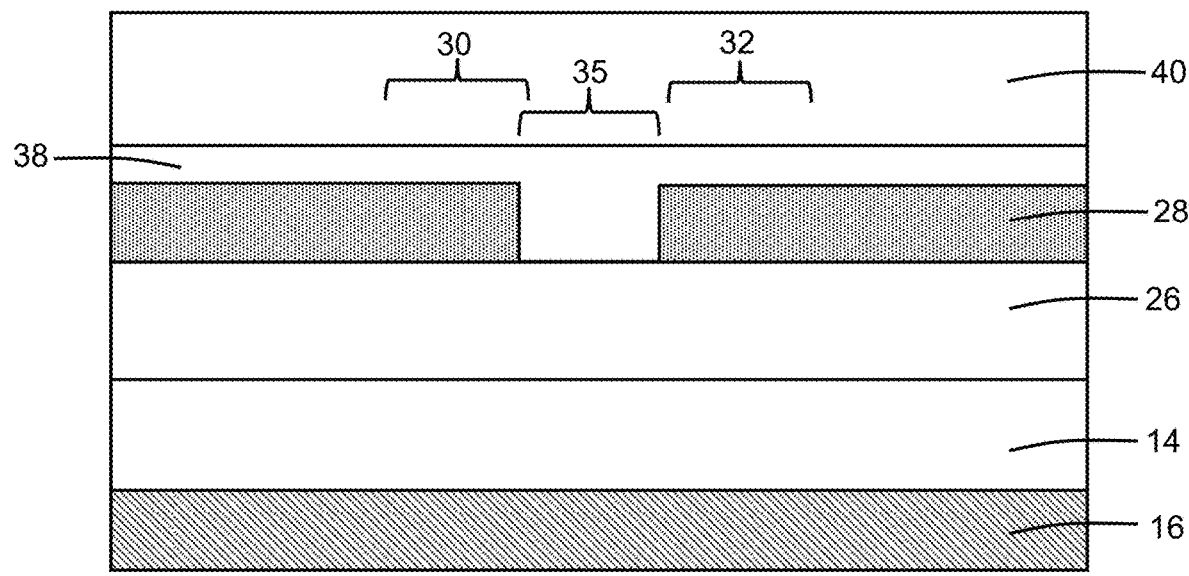

With reference to FIGS. 5, 5A in which like reference numerals refer to like features in FIGS. 4, 4A and at a subsequent fabrication stage, a dielectric layer 38 is formed over the waveguide core 28. The dielectric layer 38 may be comprised of a dielectric material, such as silicon dioxide, having a refractive index that is less than the refractive index of the material constituting the waveguide core 28. The waveguide core 28 is embedded in the dielectric layer 38, which may be planarized after deposition, because the dielectric layer 38 is thicker than the height of the waveguide core 28. As a result, the gap 35 between the section 30 and the section 32 is filled by the dielectric material of the dielectric layer 38. The thickness of the dielectric layer 38 and the height of the waveguide core 28 may be adjustable variables.

A back-end-of-line stack 40 may be formed over the dielectric layer 38. The back-end-of-line stack 40 may include stacked dielectric layers that are each comprised of a dielectric material, such as silicon dioxide, silicon nitride, tetraethylorthosilicate silicon dioxide, or fluorinated-tetraethylorthosilicate silicon dioxide.

The free space propagation regions incorporated into the structure 10 may be effective to reduce the perturbation and scattering loss of light propagating in the waveguide core 12 caused by the proximity of the waveguide core 28 at the waveguide crossing, and to also reduce the perturbation and scattering loss of light propagating in the waveguide core 28 caused by the proximity of the waveguide core 12 at the waveguide crossing.

Figure 6:
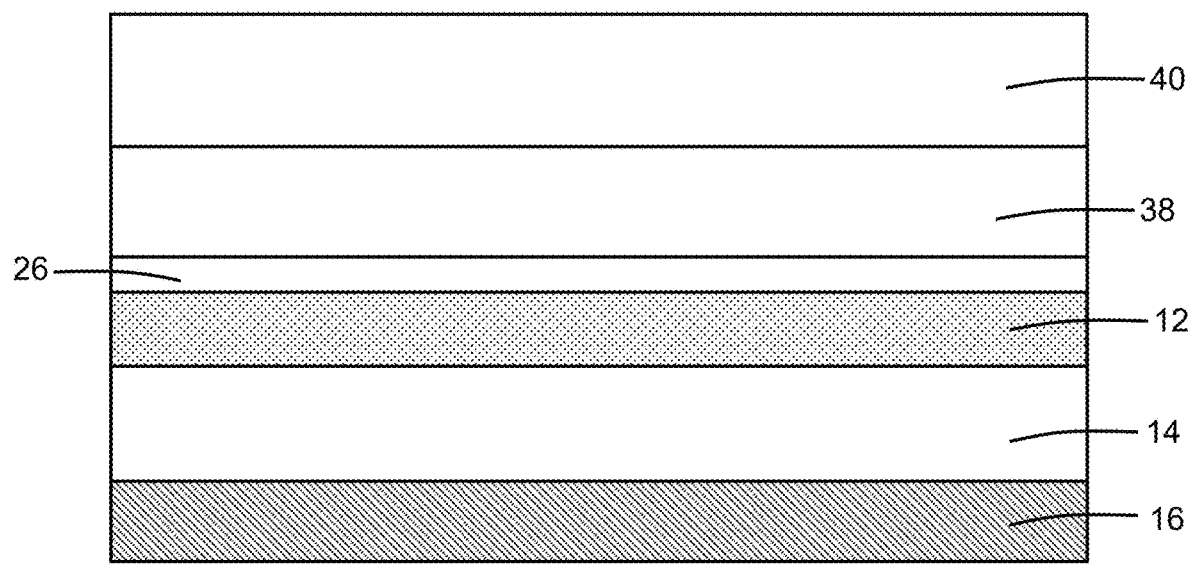
FIGS. 6, 6A are cross-sectional views of a structure in accordance with alternative embodiments of the invention.
Figure 6A:
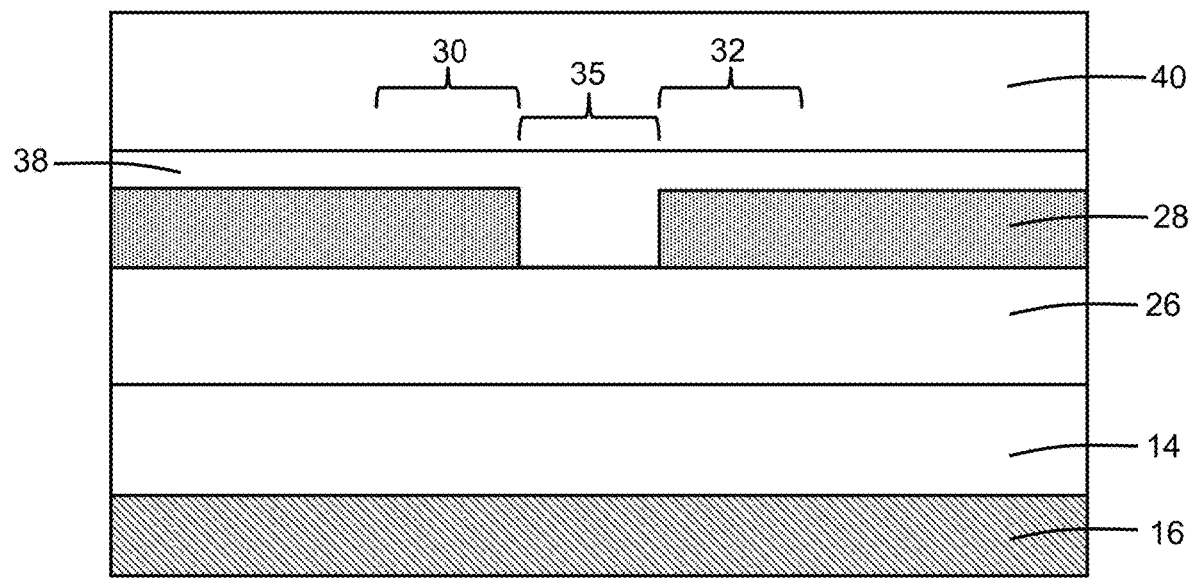

With reference to FIGS. 6, 6A and in accordance with alternative embodiments, the waveguide core 12 may be unbroken and continuous such that only the waveguide core 28 includes sections 30, 32 separated by the gap 35 to provide a free space propagation region at the crossing over the waveguide core 12.

Figure 7:
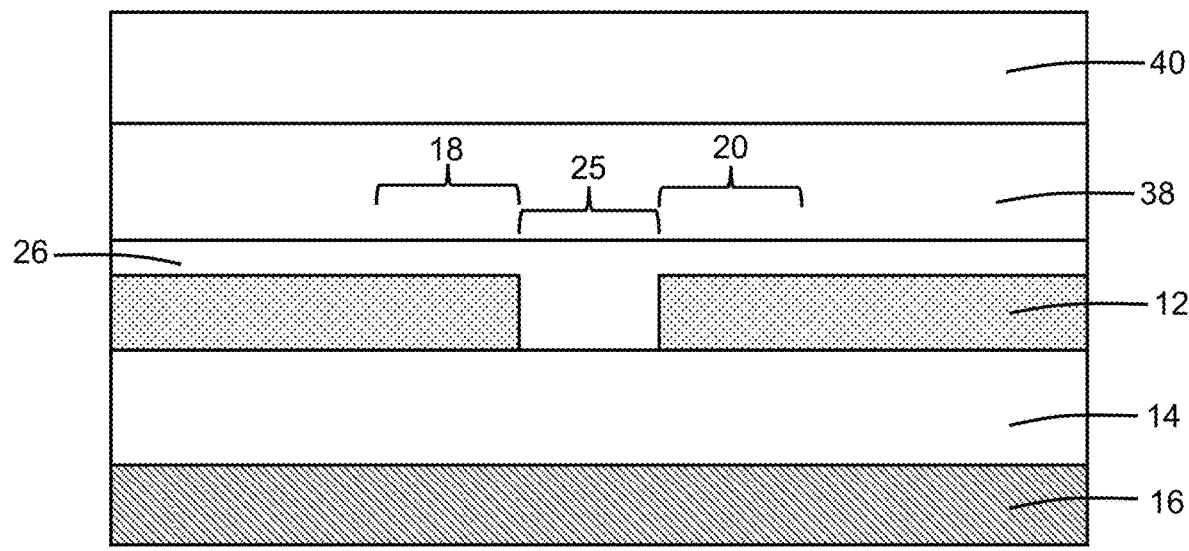
FIGS. 7, 7A are cross-sectional views of a structure in accordance with alternative embodiments of the invention.
Figure 7A:
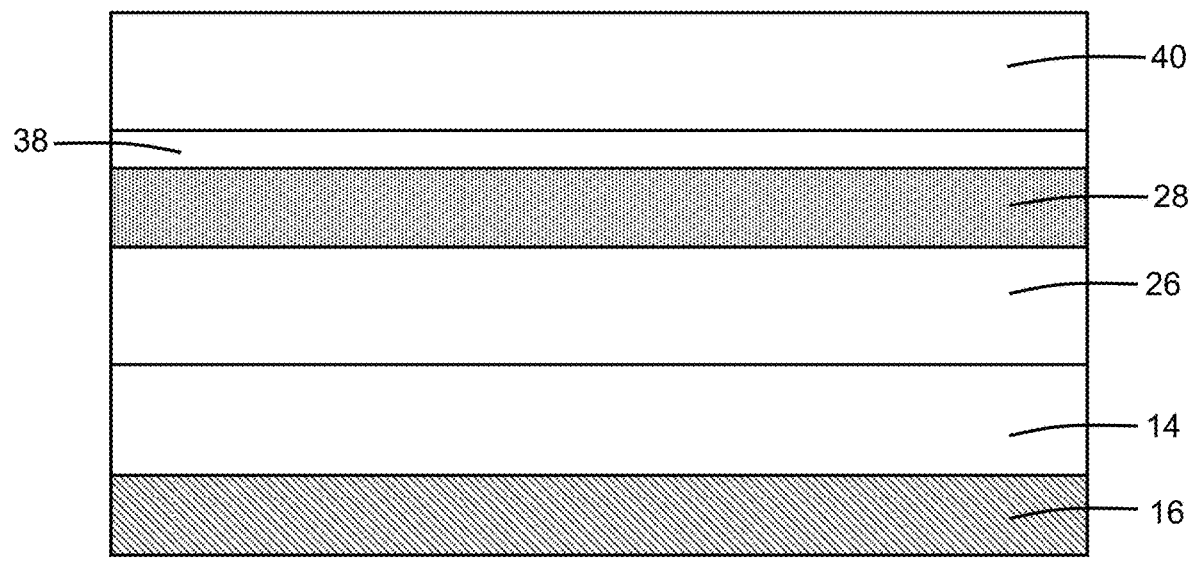

With reference to FIGS. 7, 7A and in accordance with alternative embodiments, the waveguide core 28 may be unbroken and continuous such that only the waveguide core 12 includes sections 18, 20 separated by the gap 25 to provide a free space propagation region at the crossing below the waveguide core 28.

Figure 8:
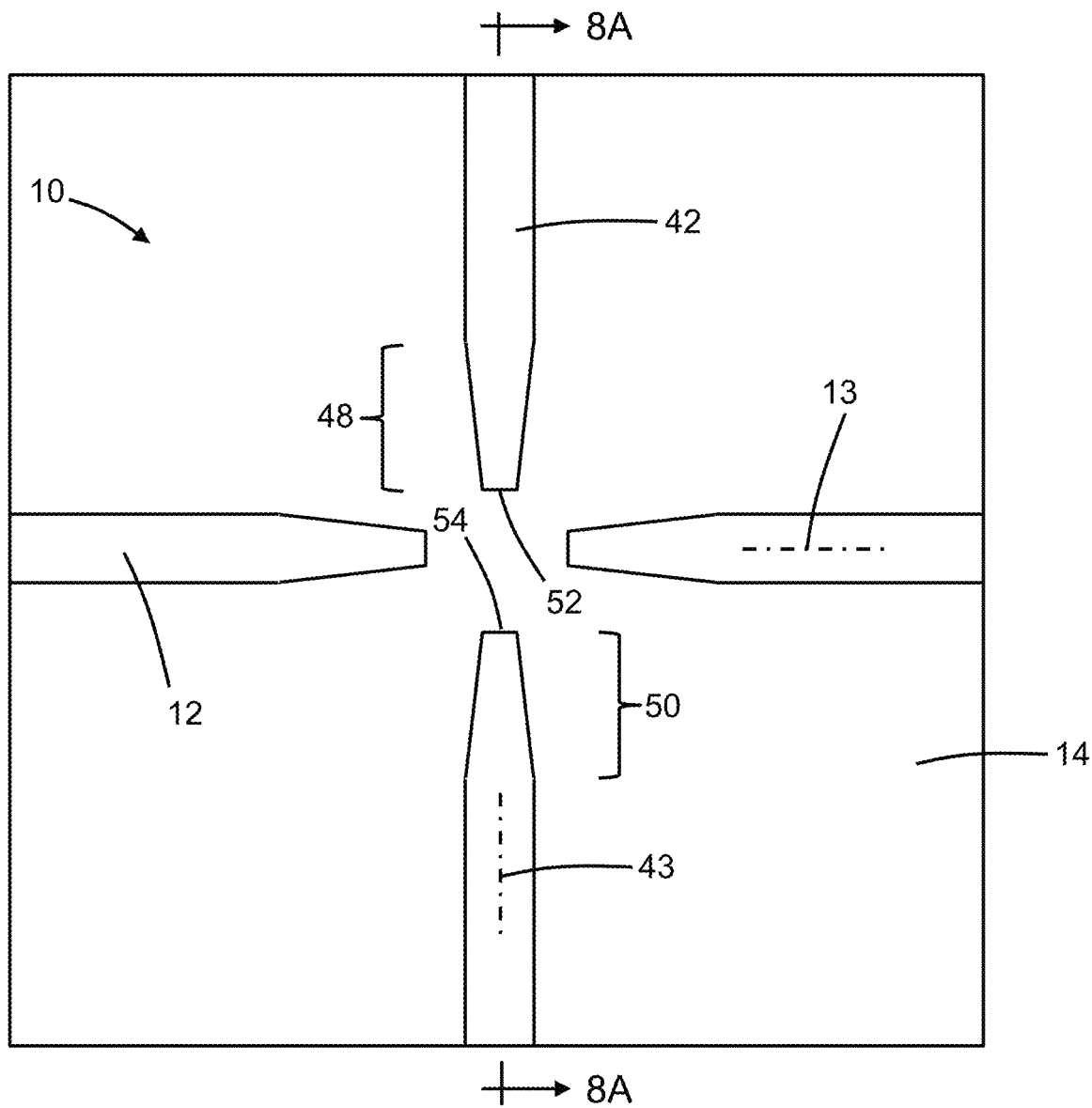
FIG. 8 is a top view of a structure in accordance with alternative embodiments of the invention.
Figure 8A:
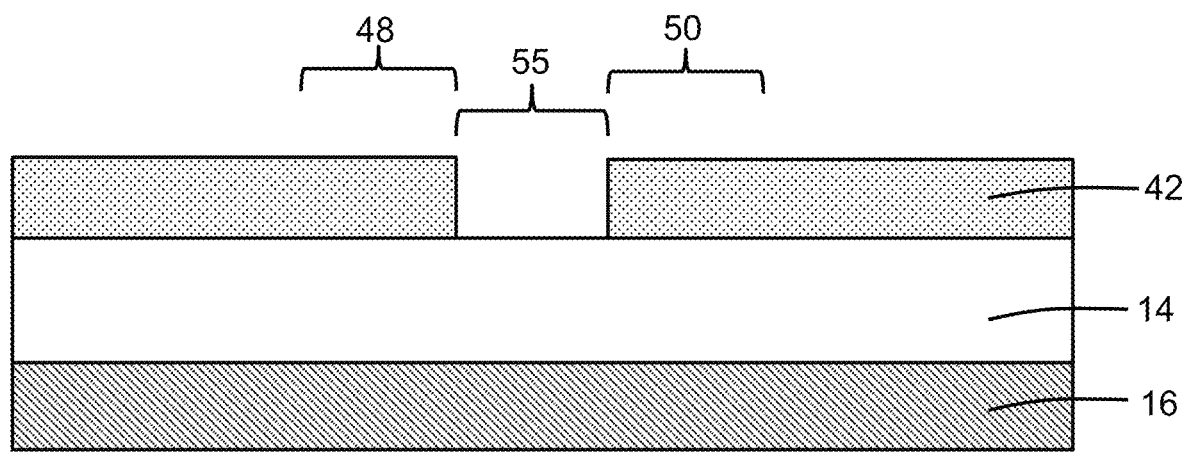
FIG. 8A is a cross-sectional view taken generally along line 8A-8A in FIG. 8.

With reference to FIGS. 8, 8A and in accordance with alternative embodiments, the structure 10 may be modified to include a waveguide core 42 that replaces the waveguide core 28 to form a single-level waveguide crossing. The waveguide core 42, which is positioned on the dielectric layer 14, may include a section 48, a section 50, an end 52 that terminates the section 48, and an end 54 that terminates the section 50. The waveguide core 42 may be lengthwise aligned along a longitudinal axis 43 that is angled relative to the longitudinal axis 13 of the waveguide core 12. In an embodiment, the longitudinal axis 43 may be aligned transverse to the longitudinal axis 13. Each of the sections 48, 50 of the waveguide core 42 may be connected to other optical components. The waveguide core 42 may be concurrently formed with the waveguide core 12 and be comprised of the same material as the waveguide core 12. The waveguide core 12 and the waveguide core 42 define a waveguide crossing in which the waveguide core 12 and the waveguide core 42 are placed in the same level or plane.

The end 52 of the section 48 is spaced in a lateral direction from the end 54 of the section 50 by a gap 55. The gap 55 defines a discontinuity in the waveguide core 42 across which light propagating in the waveguide core 42 can be transferred in a free space propagation region between the sections 48, 50 with minimal attenuation. In an embodiment, propagating light may be transferred across the gap 55 from the section 48 to the section 50. In an embodiment, propagating light may be transferred across the gap 55 from the section 50 to the section 48. The gap 55 overlaps with the gap 25 (FIG. 2) to define non-stacked, overlapping free space propagation regions.

The process flow continues by forming the dielectric layer 26, the dielectric layer 38, and back-end-of-line stack 40 over the waveguide core 12 and the waveguide core 42. The gap 25 and the gap 55 may be filled by the dielectric material of the dielectric layer 26.

Figure 9:
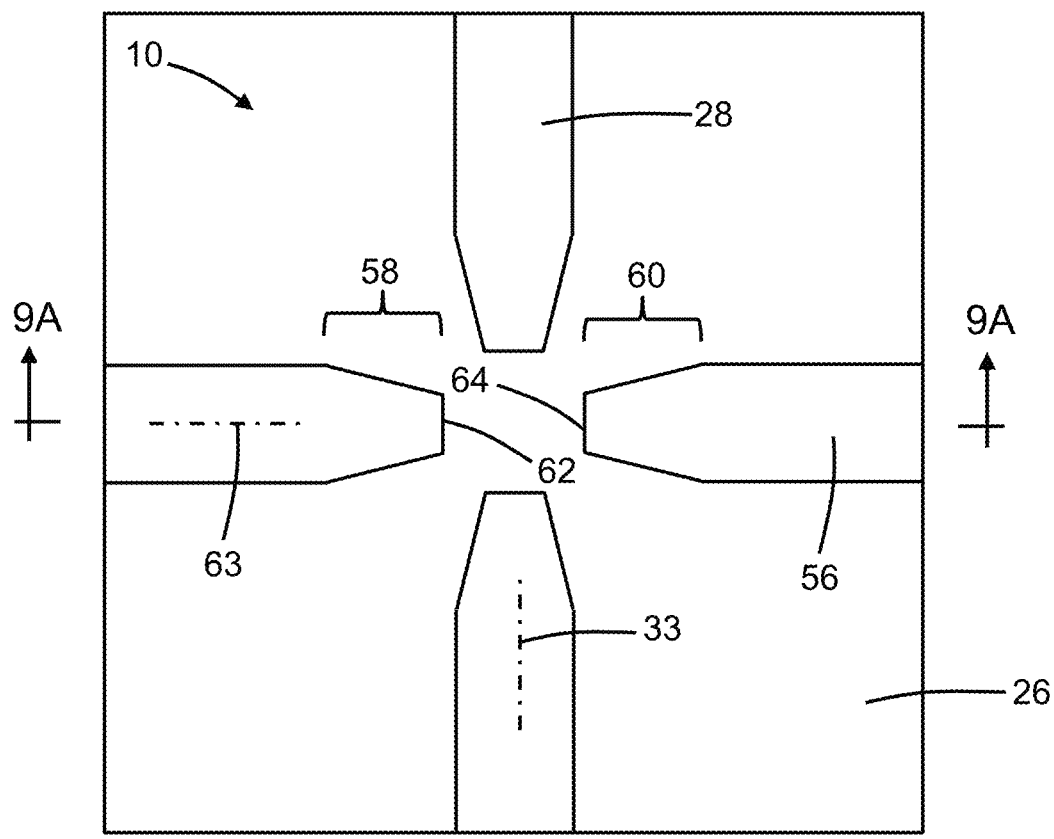
FIG. 9 is a top view of a structure in accordance with alternative embodiments of the invention.
Figure 9A:
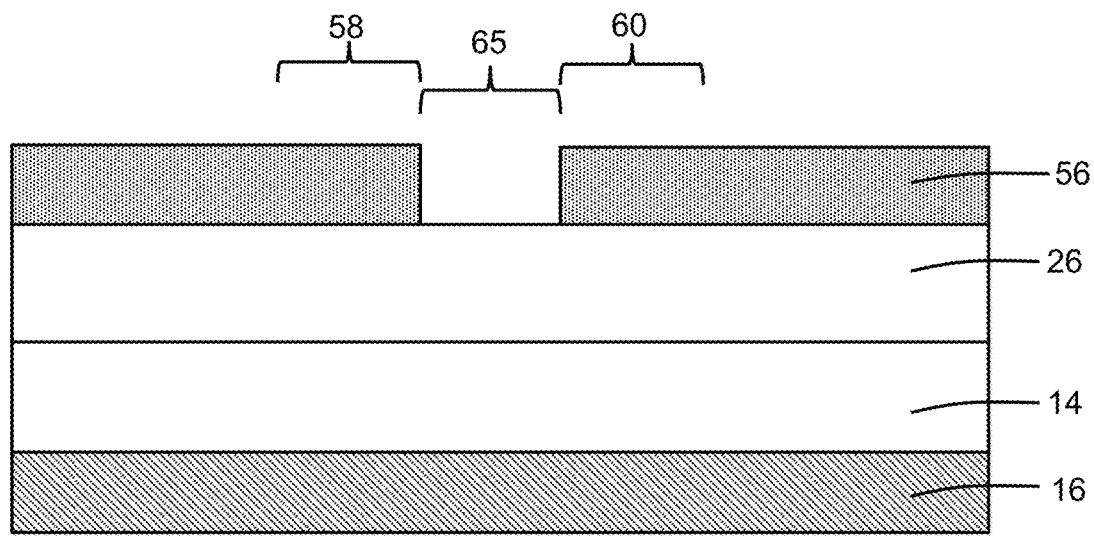
FIG. 9A is a cross-sectional view taken generally along line 9A-9A in FIG. 9.

With reference to FIGS. 9, 9A and in accordance with alternative embodiments, the structure 10 may be modified to include a waveguide core 56 that replaces the waveguide core 12 to form a single-level waveguide crossing. The waveguide core 56, which is positioned on the dielectric layer 26, may include a section 58, a section 60, an end 62 that terminates the section 58, and an end 64 that terminates the section 60. The waveguide core 56 may be lengthwise aligned along a longitudinal axis 63 that is angled relative to the longitudinal axis 33. In an embodiment, the longitudinal axis 63 may be aligned transverse to the longitudinal axis 33 of the waveguide core 28. Each of the sections 58, 60 of the waveguide core 56 may be connected to other optical components. The waveguide core 56 may be concurrently formed with the waveguide core 28 and be comprised of the same material as the waveguide core 28. The waveguide core 28 and the waveguide core 56 define a waveguide crossing in which the waveguide core 28 and the waveguide core 56 are placed in the same level or plane.

The end 62 of the section 58 is spaced in a lateral direction from the end 64 of the section 60 by a gap 65. The gap 65 defines a discontinuity in the waveguide core 56 across which light propagating in the waveguide core 56 can be transferred in a free space propagation region between the sections 58, 60 with minimal attenuation. In an embodiment, propagating light may be transferred across the gap 65 from the section 58 to the section 60. In an embodiment, propagating light may be transferred across the gap 65 from the section 60 to the section 58. The gap 65 overlaps with the gap 35 (FIG. 4) to define non-stacked, overlapping free space propagation regions.

The process flow continues by forming the dielectric layer 38 and back-end-of-line stack 40 over the waveguide core 28 and the waveguide core 56. The gap 35 and the gap 65 may be filled by the dielectric material of the dielectric layer 38.

Figure 10:
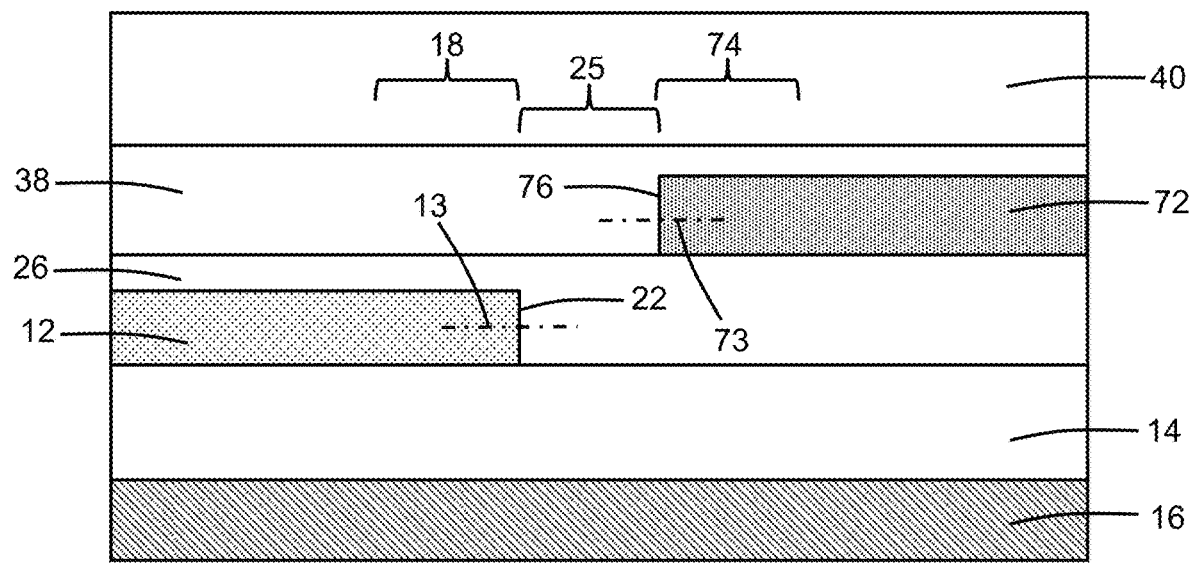
FIGS. 10, 10A are cross-sectional views of a structure in accordance with alternative embodiments of the invention.
Figure 10A:
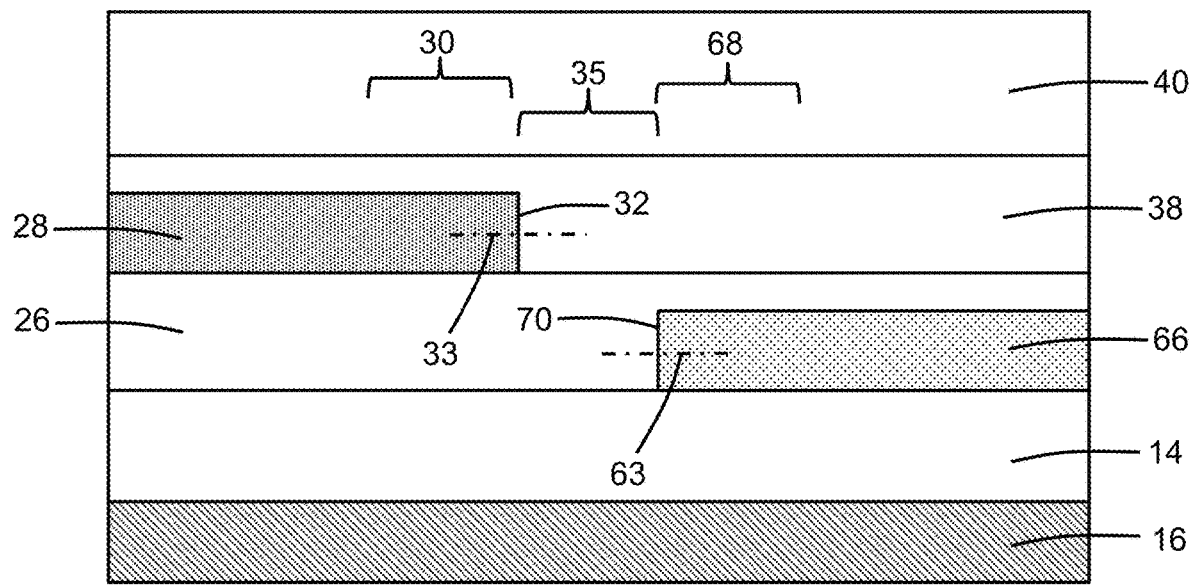

With reference to FIGS. 10, 10A and in accordance with alternative embodiments, the structure 10 may be modified such that the waveguide core 12 includes the section 18 that terminates at the end 22 and omits the section 20, and the waveguide core 28 includes the section 30 that terminates at the end 34 and omits the section 32. A waveguide core 66, which is positioned on the dielectric layer 14, may include a section 68 similar to the section 18 and an end 70 that terminates the section 68. The waveguide core 66 may be comprised of the same material as the waveguide core 12. A waveguide core 72, which is positioned on the dielectric layer 26, may include a section 74 similar to the section 30 and an end 64 that terminates the section 74. The waveguide core 72 may be comprised of the same material as the waveguide core 28. In an embodiment, the waveguide cores 28, 72 may be comprised of a different material than the waveguide cores 12, 66.

The section 74 of the waveguide core 72 has a longitudinal axis 73 aligned parallel to the longitudinal axis 13 of section 18 of the waveguide core 12. As best shown in FIG. 10, the gap 25 is arranged between the section 18 of the waveguide core 12 and the section 74 of the waveguide core 72, and light is diagonally transferred at the waveguide crossing between the section 18 of the waveguide core 12 in a lower level and the section 74 of the waveguide core 72 in an upper level. The section 68 of the waveguide core 66 has a longitudinal axis 63 aligned parallel to the longitudinal axis 33 of section 30 of the waveguide core 28. As best shown in FIG. 10A, the gap 35 is arranged between the section 30 of the waveguide core 28 and the section 68 of the waveguide core 66, and light is diagonally transferred at the waveguide crossing between the section 68 of the waveguide core 66 in a lower level and the section 30 of the waveguide core 28 in an upper level.

Figure 11:
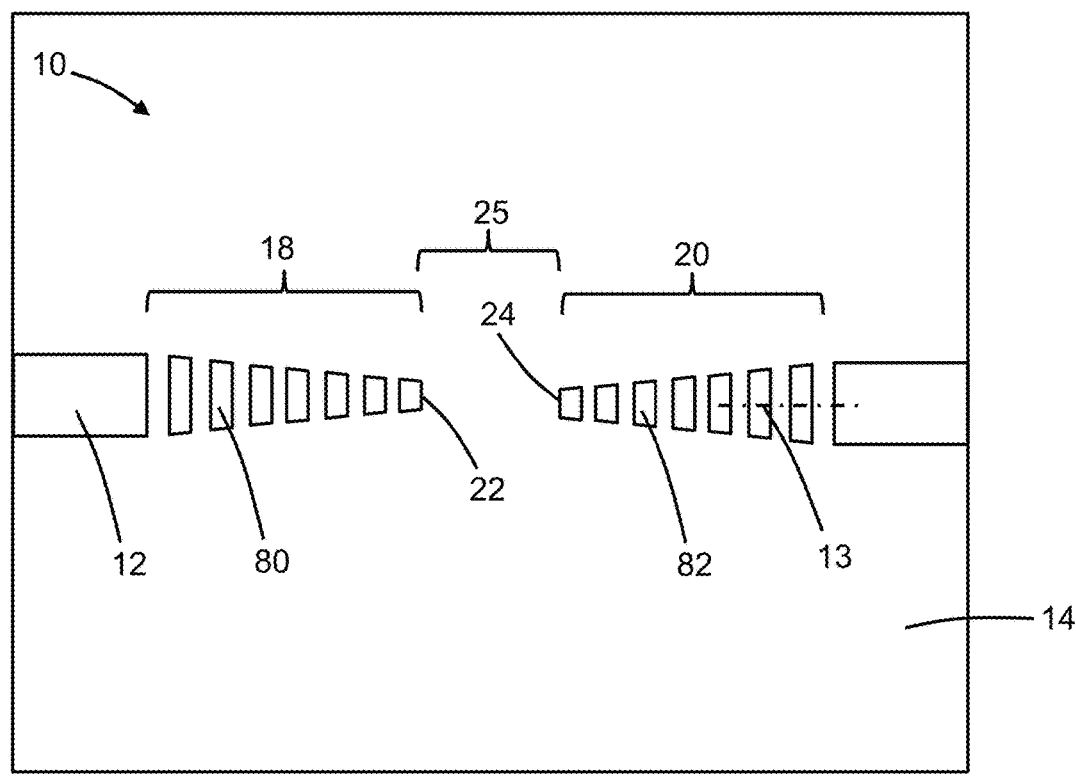
FIG. 11 is a top view of a structure in accordance with alternative embodiments of the invention.

With reference to FIG. 11 and in accordance with alternative embodiments, the structure 10 may be modified such that the section 18 of the waveguide core 12 includes segments 80 that are positioned with a spaced-arrangement along the longitudinal axis 13, and the section 20 of the waveguide core 12 includes segments 82 that are positioned with a spaced-arrangement along the longitudinal axis 13. Adjacent pairs of the segments 80 and adjacent pairs of the segments 82 are separated by spaces or gaps. In an alternative embodiment, a rib may be overlaid on the segments 80 and/or the segments 82.

In an embodiment, the pitch and duty cycle of the segments 80 and/or the segments 82 may be uniform to define a periodic arrangement. In alternative embodiments, the pitch and/or the duty cycle of the segments 80 and/or the segments 82 may be apodized (i.e., non-uniform) to define a non-periodic arrangement. The segments 80 and/or the segments 82 may be dimensioned and positioned at small enough pitch so as to define a sub-wavelength grating that does not radiate or reflect light at a wavelength of operation, such as a wavelength in a range of 400 nm to 3000 nm.

The subsequently-deposited dielectric layer 26 is disposed in the gaps between adjacent pairs of the segments 80 and in the gaps between adjacent pairs of the segments 82. The segments 80, 82 and the dielectric material of the dielectric layer 26 in the gaps between adjacent segment pairs may define metamaterial structures in which the material constituting the segments 80, 82 has a higher refractive index than the dielectric material of the dielectric layer 26. The metamaterial structures can be treated as homogeneous materials each having an effective refractive index that is intermediate between the refractive index of the material constituting the segments 80, 82 and the refractive index of the dielectric material constituting the dielectric layer 26.

Figure 12:
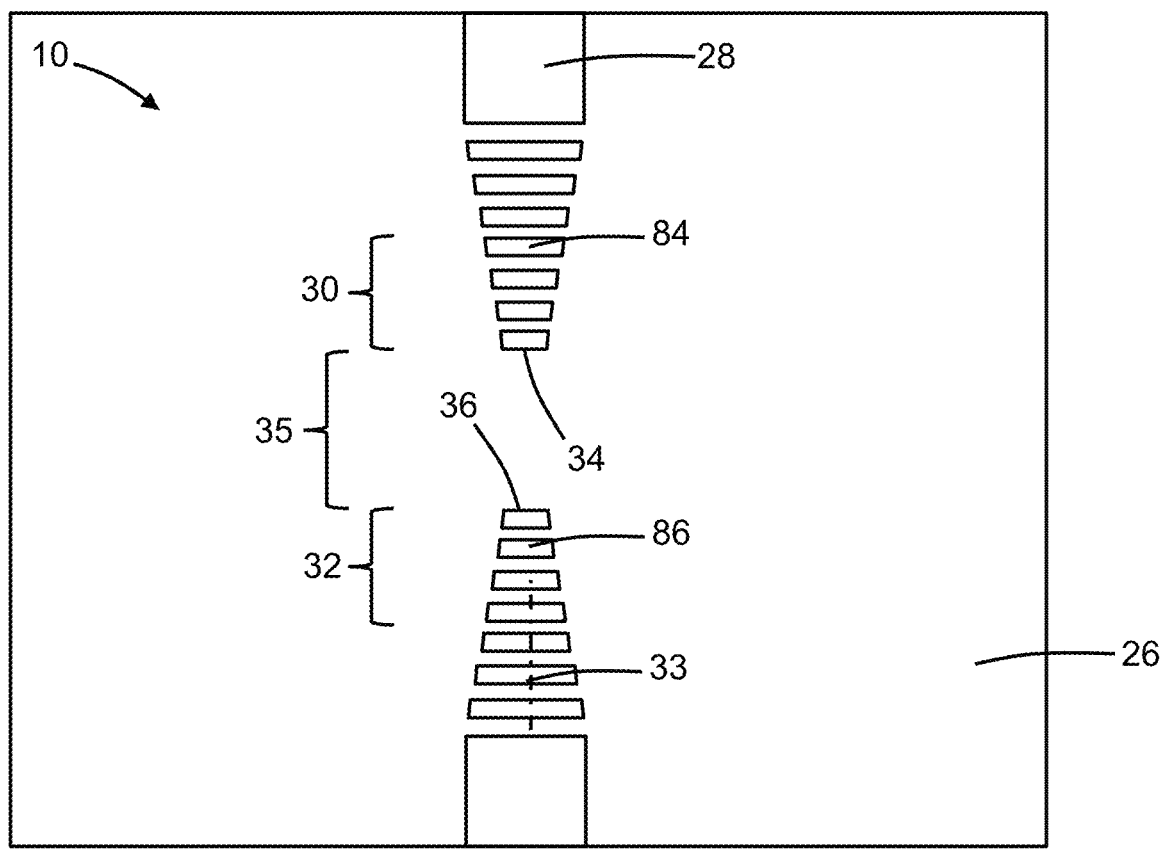
FIG. 12 is a top view of a structure in accordance with alternative embodiments of the invention.

With reference to FIG. 12 and in accordance with alternative embodiments, the structure 10 may be modified such that the section 30 of the waveguide core 28 includes segments 84 that are positioned with a spaced-arrangement along the longitudinal axis 33, and the section 32 of the waveguide core 28 includes segments 86 that are positioned with a spaced-arrangement along the longitudinal axis 33. Adjacent pairs of the segments 84 and adjacent pairs of the segments 86 are separated by spaces or gaps. In an alternative embodiment, a rib may be overlaid on the segments 84 and/or the segments 86.

In an embodiment, the pitch and duty cycle of the segments 84 and/or the segments 86 may be uniform to define a periodic arrangement. In alternative embodiments, the pitch and/or the duty cycle of the segments 84 and/or the segments 86 may be apodized (i.e., non-uniform) to define a non-periodic arrangement. The segments 84 and/or the segments 86 may be dimensioned and positioned at small enough pitch so as to define a sub-wavelength grating that does not radiate or reflect light at a wavelength of operation, such as a wavelength in a range of 400 nm to 3000 nm.

The subsequently-deposited dielectric layer 38 is disposed in the gaps between adjacent pairs of the segments 84 and in the gaps between adjacent pairs of the segments 86. The segments 84, 86 and the dielectric material of the dielectric layer 38 in the gaps between adjacent segment pairs may define metamaterial structures in which the material constituting the segments 84, 86 has a higher refractive index than the dielectric material of the dielectric layer 38. The metamaterial structures can be treated as homogeneous materials each having an effective refractive index that is intermediate between the refractive index of the material constituting the segments 84, 86 and the refractive index of the dielectric material constituting the dielectric layer 38.

Figure 13:
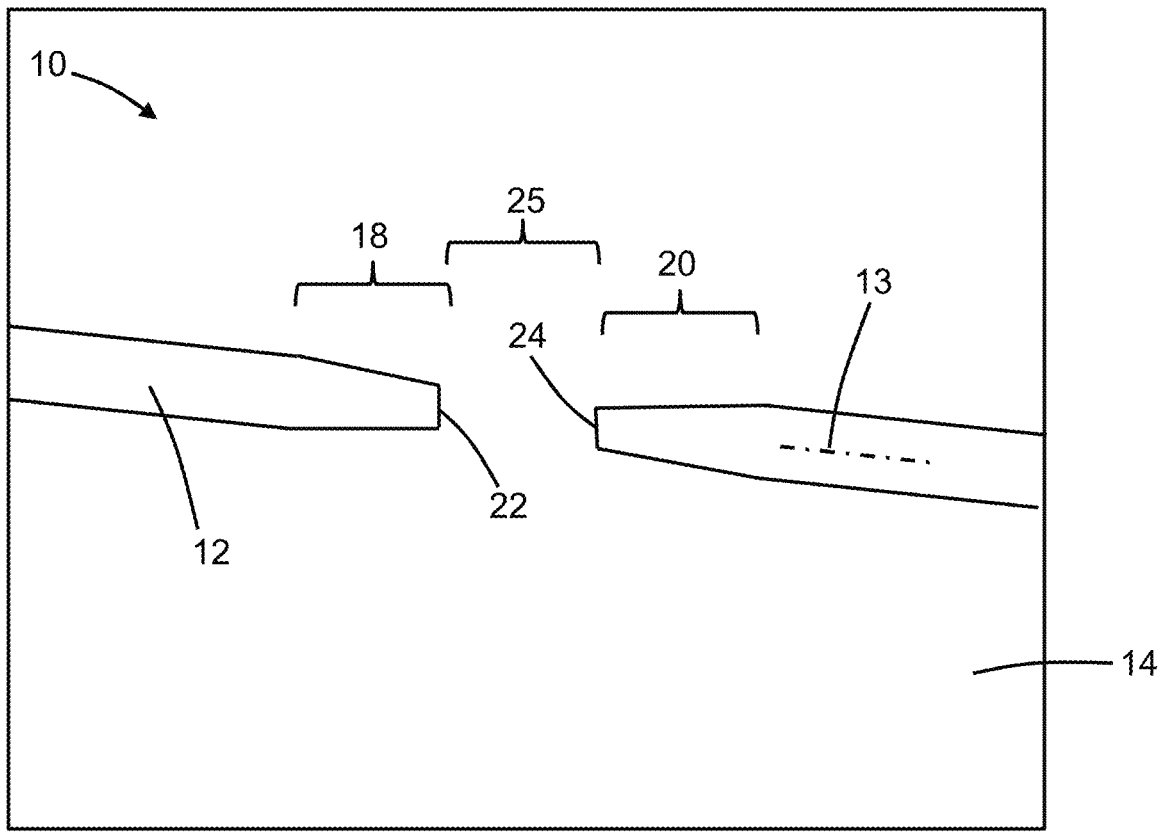
FIGS. 13, 13A are top views of a structure in accordance with alternative embodiments of the invention.
Figure 13A:
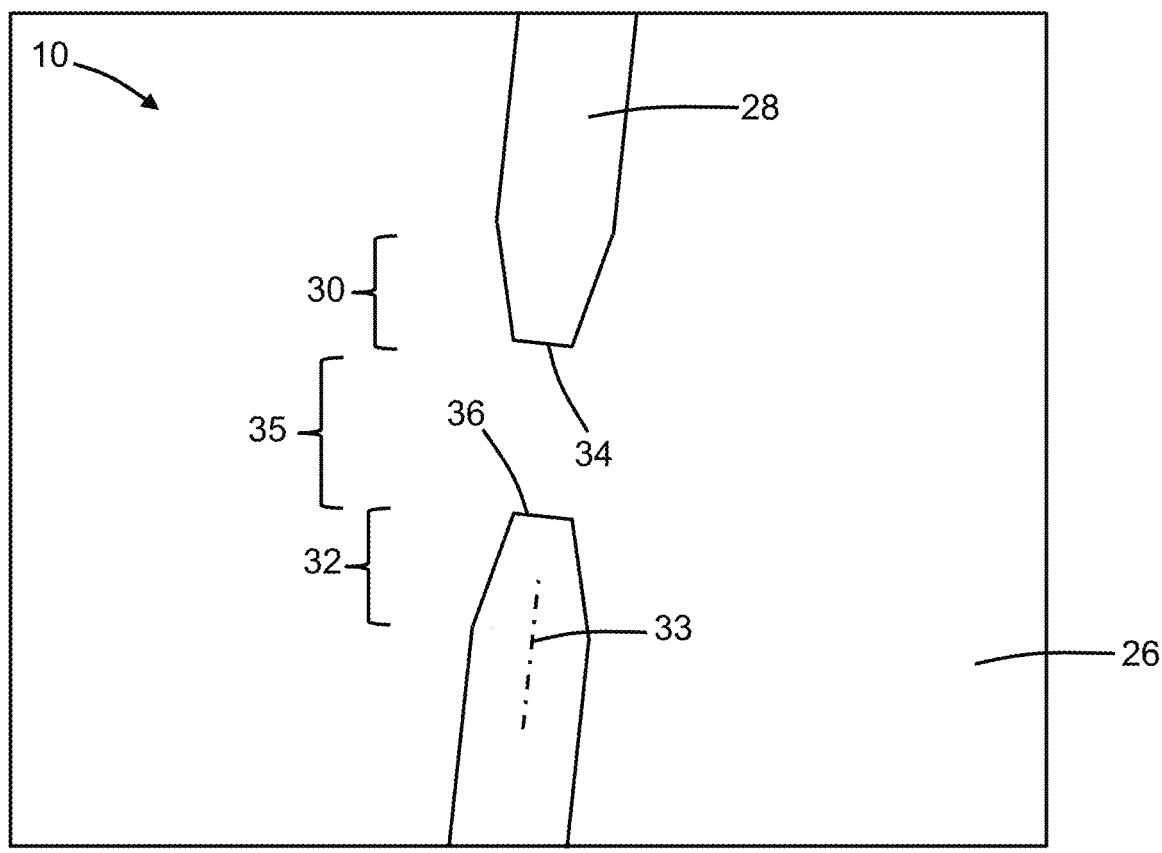

With reference to FIGS. 13, 13A and in accordance with alternative embodiments, the angular orientations of the sections 18, 20 of the waveguide core 12, in a horizontal plane, may be slanted such that the ends 22, 24 on opposite sides of the gap 25 are angled relative to the longitudinal axis 13. The slant of the section 18 of the waveguide core 12 and the slant of the section 20 of the waveguide core 12 may be effective to reduce back reflection for the interfaces between the dielectric material in the gap 25 and the ends 22, 24 at which the refractive index changes. The sections 30, 32 of the waveguide core 28 may be similarly slanted, in a horizontal plane, such that the ends 34, 36 are angled relative to the longitudinal axis 33 in order to reduce back reflection from the ends 34, 36 on opposite sides of the gap 35.

Figure 14:
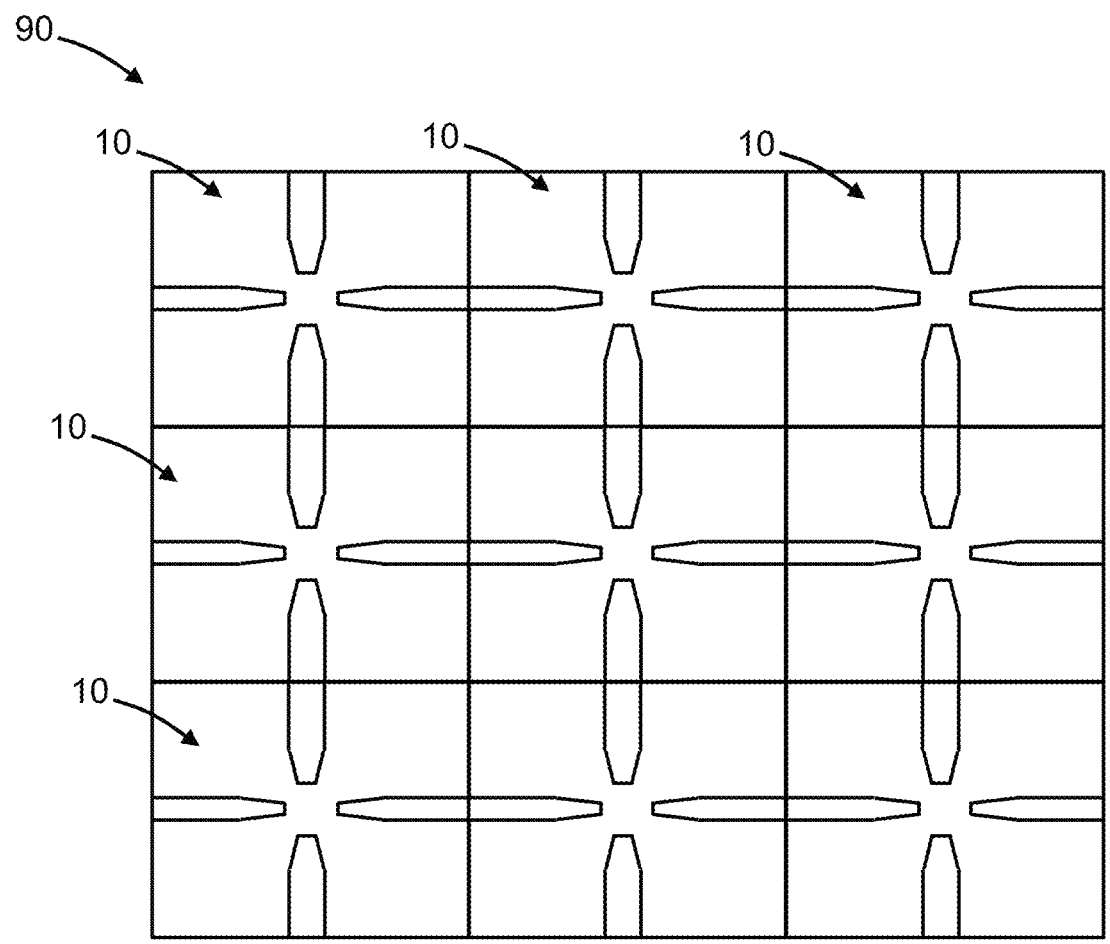
FIG. 14 is a diagrammatic top view of a structure in accordance with alternative embodiments of the invention.

With reference to FIG. 14 and in accordance with alternative embodiments, the structure 10 may be replicated and arranged to form elements in an n-by-n array 90 of substantially-identical waveguide crossings in a photonic integrated circuit. In the various embodiments disclosed herein, the structure 10 may enable the construction of a high-density and large-scale n-by-n array 90 of waveguide crossings.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a waveguide crossing, the structure comprising:

a substrate;

a first waveguide core including a first section, a second section, and a first longitudinal axis, the first section and the second section aligned along the first longitudinal axis, the first section terminated by a first end, the second section terminated by a second end, and the first end of the first section longitudinally spaced from the second end of the second section by a first gap; and a second waveguide core including a third section, a fourth section, and a second longitudinal axis angled relative to the first longitudinal axis, the first waveguide core positioned in a vertical direction between the second waveguide core and the substrate, the third section and the fourth section aligned along the second longitudinal axis, the third section terminated by a third end, the fourth section terminated by a fourth end, the third end of the third section longitudinally spaced from the fourth end of the fourth section by a second gap, the second longitudinal axis crossing the first longitudinal axis within the first gap, and the second gap overlapping with the first gap.

2. The structure of claim 1 further comprising:

a dielectric layer positioned in the vertical direction between the first waveguide core and the second waveguide core, the dielectric layer comprising a dielectric material, wherein the first gap is filled by the dielectric material.

3. The structure of claim 1 wherein the waveguide crossing is an element included in an array of waveguide crossings.

4. The structure of claim 1 wherein the second waveguide core has a width dimension, and the first gap is wider than the width dimension of the second waveguide core.

5. The structure of claim 1 wherein the first section has a first width dimension that increases with increasing distance from the first end, and the second section has a second width dimension that increases with increasing distance from the second end.

6. The structure of claim 1 wherein the first end of the first section and the second end of the second section are slanted relative to the first longitudinal axis.

7. The structure of claim 1 wherein the first section of the first waveguide core includes a first plurality of segments positioned in a first spaced-apart arrangement along the first longitudinal axis, and the second section of the first waveguide core includes a second plurality of segments positioned in a second spaced-apart arrangement along the first longitudinal axis.

8. The structure of claim 7 wherein the first plurality of segments comprise a first subwavelength grating, and the second plurality of segments comprise a second subwavelength grating.

9. The structure of claim 1 wherein the first waveguide core is separated in the vertical direction from the second waveguide core by a spacing, and the spacing is in a range of 1 nanometer to 500 nanometers.

10. The structure of claim 1 wherein the first waveguide core comprises a first material, and the second waveguide core comprises a second material different from the first material.

11. The structure of claim 1 wherein the first gap is configured for the transfer of light by free space propagation between the first section and the second section.

12. The structure of claim 1 wherein the second gap is configured for the transfer of light by free space propagation between the third section and the fourth section.

13. The structure of claim 1 wherein the first waveguide core has a width dimension, and the second gap is wider than the width dimension of the first waveguide core.

14. The structure of claim 1 wherein the first waveguide core has a first width dimension, and the second gap is wider than the first width dimension of the first waveguide core.

15. The structure of claim 14 wherein the second waveguide core has a second width dimension, and the first gap is wider than the second width dimension of the second waveguide core.

16. A structure for a waveguide crossing, the structure comprising:
   a dielectric layer;
   a first waveguide core positioned below the dielectric layer, the first waveguide core including a section terminated by a first end and aligned along a first longitudinal axis;
   a second waveguide core positioned above the dielectric layer, the second waveguide core including a section terminated by a second end and aligned along a second longitudinal axis that is parallel to the first longitudinal axis, and the second end longitudinally spaced from the first end by a first gap;
   a third waveguide core positioned below the dielectric layer, the third waveguide core including a section terminated by a third end and aligned along a third longitudinal axis; and
   a fourth waveguide core positioned above the dielectric layer, the fourth waveguide core including a section terminated by a fourth end and aligned along a fourth longitudinal axis that is parallel to the third longitudinal axis, and the fourth end longitudinally spaced from the third end by a second gap,
   wherein the first longitudinal axis and the second longitudinal axis are angled relative to the third longitudinal axis and the fourth longitudinal axis.

17. The structure of claim 16 wherein the first waveguide core and the third waveguide core comprise a first material, and the second waveguide core and the fourth waveguide core comprise a second material different from the first material.

18. The structure of claim 16 wherein the waveguide crossing is an element included in an array of waveguide crossings.

19. A method of forming a structure for a waveguide crossing, the method comprising:
   forming a first waveguide core including a first section, a second section, and a first longitudinal axis, wherein the first section and the second section are aligned along the first longitudinal axis, the first section is terminated by a first end, the second section is terminated by a second end, and the first end of the first section is longitudinally spaced from the second end of the second section by a first gap; and
   forming a second waveguide core including a third section, a fourth section, and a second longitudinal axis angled relative to the first longitudinal axis, wherein the first waveguide core is positioned in a vertical direction between the second waveguide core and a substrate, the third section and the fourth section are aligned along the second longitudinal axis, the third section is terminated by a third end, the fourth section is terminated by a fourth end, the third end of the third section is longitudinally spaced from the fourth end of the fourth section by a second gap, the second longitudinal axis crosses the first longitudinal axis within the first gap, and the second gap overlaps with the first gap.

20. The method of claim 19 wherein the waveguide crossing is an element that is formed in an array of waveguide crossings.

* * * * *